(12) United States Patent
Fan (10) Patent No.: US 8,864,226 B2
(45) Date of Patent: Oct. 21, 2014

(54) APPARATUS FOR HANGING ON SEATBACK INSIDE VEHICLE

(76) Inventor: Eagle Fan, Hsinchu (TW)

(*) Notice: Subject to any disclaimer, the term of this patent is extended or adjusted under 35 U.S.C. 154(b) by 279 days.

(21) Appl. No.: 13/545,574

(22) Filed: Jul. 10, 2012

(65) Prior Publication Data

US 2014/0015289 A1 Jan. 16, 2014

(51) Int. Cl.
*A47C 7/62* (2006.01)
*B60N 3/00* (2006.01)

(52) U.S. Cl.
CPC .. *B60N 3/004* (2013.01); *A47C 7/62* (2013.01)
USPC ................. 297/188.05; 297/188.06

(58) Field of Classification Search
CPC .................................. A47C 7/62; B60N 3/004
USPC ....................... 297/188.05, 188.06
See application file for complete search history.

(56) References Cited

U.S. PATENT DOCUMENTS

| | | | | |
|---|---|---|---|---|
| 4,792,183 | A * | 12/1988 | Townsend, III | 297/188.06 |
| 7,111,814 | B1 * | 9/2006 | Newman | 297/188.06 X |
| 7,862,112 | B2 * | 1/2011 | Caturla et al. | 297/188.06 |
| 8,733,831 | B2 * | 5/2014 | Brawner | 297/188.05 |

* cited by examiner

*Primary Examiner* — Anthony D Barfield
(74) *Attorney, Agent, or Firm* — Rabin & Berdo, P.C.

(57) ABSTRACT

An apparatus for hanging on seatback inside vehicle is provided, including a support unit, a platform unit, a fasten unit and a push unit. The support unit and the platform unit are coupled on one side, and can be expanded to an L shape structure. The platform unit includes a first placement area and at least a concave positioning groove on the side facing the support unit. The platform unit includes a hanger shoulder. The support unit is disposed with a press element able to adjust position on side wall facing the platform unit. The fasten unit is coupled to back of the support unit for fastening to column of seat headrest. The push unit is installed at the platform unit, and can extend beyond the platform unit after adjustment. As such, the apparatus allows the backseat passenger to use portable electronic device or hanging clothes.

9 Claims, 9 Drawing Sheets

APPARATUS FOR HANGING ON SEATBACK INSIDE VEHICLE

FIELD OF THE INVENTION

The present invention generally relates to an auxiliary apparatus, and more specifically to an auxiliary apparatus for hanging on seatback inside vehicle.

BACKGROUND OF THE INVENTION

As cars are a common transportation vehicle and portable electronic devices, such as, smart phone and tablet PC, become a mainstream communication and entertainment gadget, the use of portable devices in cars creates a demand in auxiliary apparatus for using portable devices in cars. While the driver using portable device may pose potential hazard, the passenger using portable device inside vehicle is a good way to stay entertained.

To provide good riding environment for passengers, some manufacturers developed auxiliary apparatus applicable to seatback inside vehicle. These known auxiliary apparatuses are often fastened to the rods supporting the headrest on the seatback of the front seat for holding portable electronic device, such as, tablet, for viewing. However, such auxiliary apparatus is not convenient for users to operate the device, such as, playing games or typing. Furthermore, the majority of these known auxiliary apparatuses can only fit a specific size, which causes further inconvenience for users with devices of different sizes.

SUMMARY OF THE INVENTION

The primary object of the present invention is to provide an apparatus for hanging on seatback inside vehicle to provide various supporting purposes. The apparatus can be engaged to fasten between the backseat and the headrest inside a vehicle. When the structure of the apparatus is expanded, the apparatus provides a platform for placing objects so that the backseat passenger can use as a temporary desk surface. In addition, various types of portable electronic devices, such as, smart phone, tablet PC, notebook PC, and so on, can also be placed and fastened as held by a holding apparatus. In this manner, the user can use the portable device for viewing or for operation. Furthermore, the folded apparatus, after adjustment, can function as a temporary clothes hanger for the driver to hang expensive or formal attire.

To achieve the above object, the present invention provides an apparatus for hanging on seatback inside vehicle, including a support unit, a platform unit, a fasten unit and a push unit. The support unit and the platform unit are coupled on one side, and can be expanded to an L shape structure. The platform unit includes a first placement area and at least a concave positioning groove on the side facing the support unit. The platform unit includes a hanger shoulder. The support unit is disposed with a press element able to adjust position on side wall facing the platform unit. The fasten unit is coupled to back of the support unit for fastening to column of seat headrest. The push unit is installed at the platform unit, and can extend beyond the platform unit after adjustment. The extending location is close to coupling position of the platform unit and the support unit.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
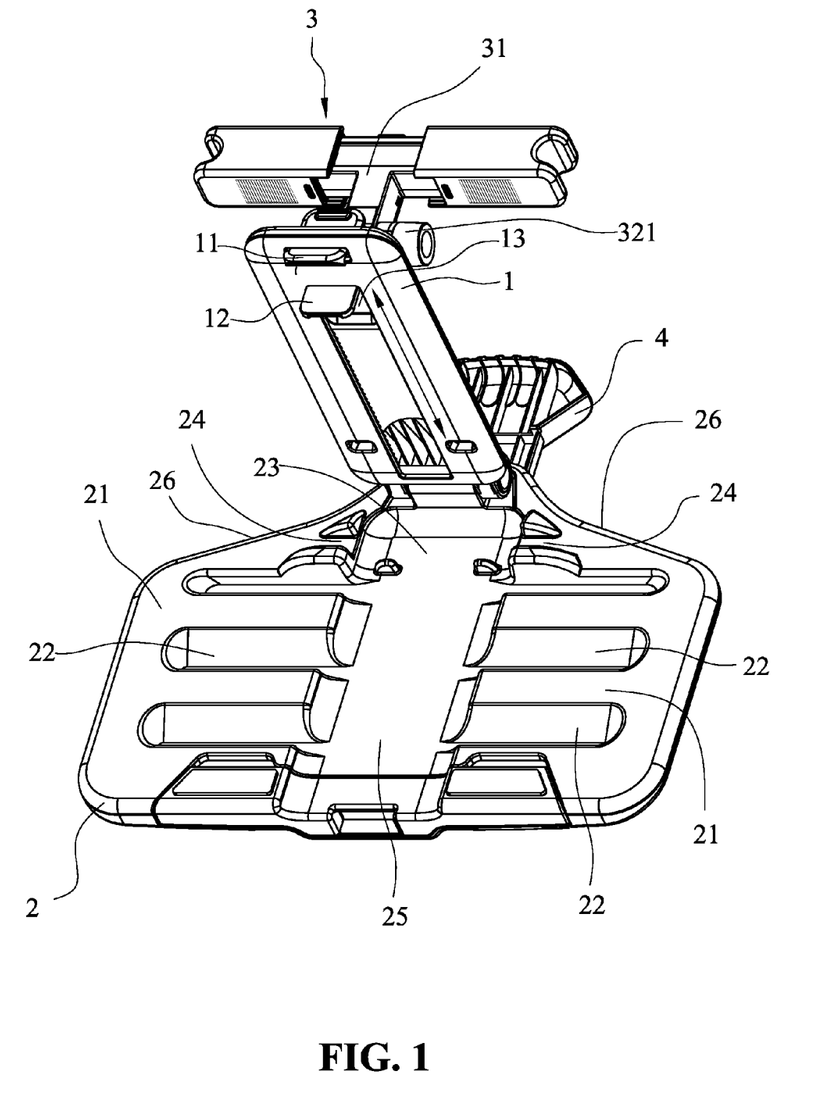
FIG. 1 shows a schematic view of the present invention when expanded.
Figure 2:
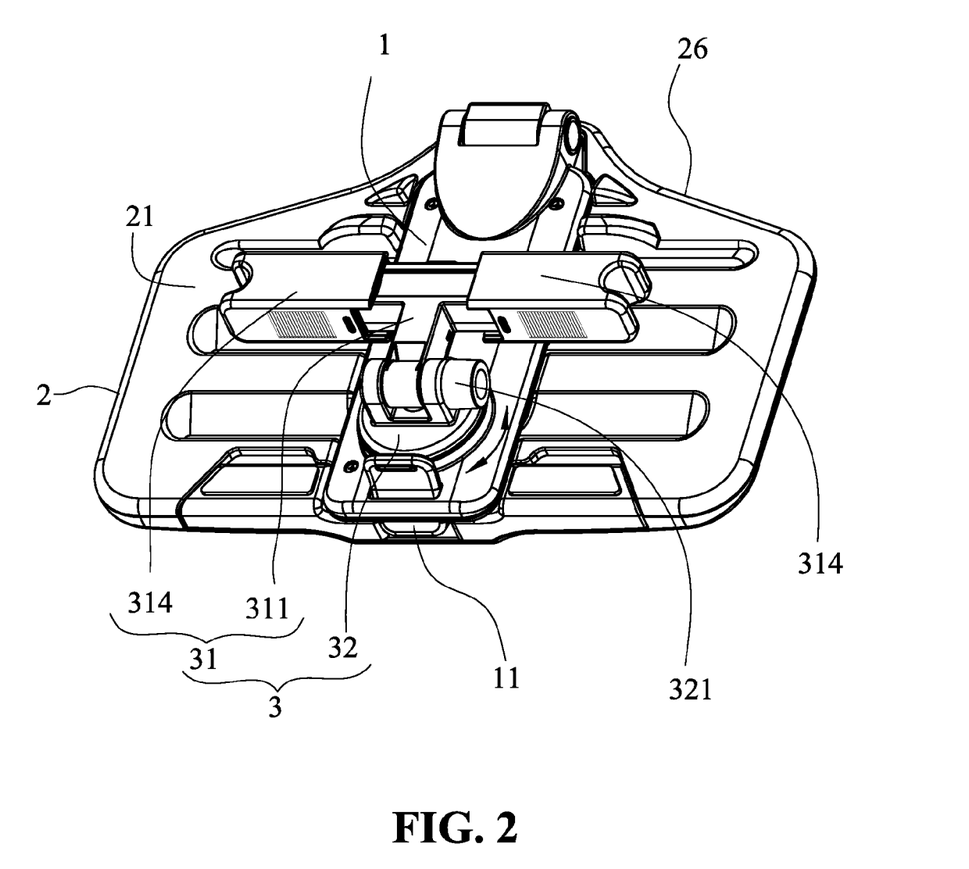
FIG. 2 shows a schematic view of the present invention when folded.

FIG. 1 and FIG. 2 are schematic views of the present invention in expansion and folded state respectively according to the invention. The apparatus for hanging on seatback inside vehicle of the present invention is installed at columns of headrest fixed to seat, for providing users to use the product behind the seat. The structure includes a support unit 1, a platform unit 2, a fasten unit 3 and a push unit 4.

The following describes each component in details.

Support unit 1 and platform unit 2 are coupled on one side and can be expanded into an L shape. For storage, support unit 1 and platform unit 2 can be folded together. Support unit 1 is disposed with a buckle element 11 at one side away from coupling position. Buckle element 11 is for hooking unto platform unit 2 when support unit 1 and platform unit 2 are folded. Size of platform unit 2 is several times of size of support unit 1. In the present embodiment, platform unit 2 includes a first placement area 21 and at least a positioning grove 22 on side facing support unit 1. First placement area 21 covers a majority of surface area of platform unit 1, and is for placing objects. Positioning groove 22 is distributed within area covered by first placement area 21, and has a long stripe shape. Some of positioning grooves 22 are located on a straight line.

On side wall facing platform unit 2, supporting unit 1 is disposed with a press element 12 able to adjust position. Press element 12 is coupled to a positioning slide block 13. When not in use, press 12 can be flipped downward to stay with positioning slide block 13. Positioning slide block 13 has a structure similar to conventional structure, i.e., with resilient protruding teeth on both sides. When applied force is greater than a threshold, positioning slide block 13 can slide up and down. When applied force disappears, protruding teeth restore to stuck position and positioning slide block 13 is clocked. As shown in FIG. 1, the arrows indicate that positioning slide block can move upward and downward. In the present embodiment, first placement area 21 is for placing portable electronic devices, such as, tablet PC or notebook PC, so that user can operate with convenience. When the tablet PC is placed in a tilting position, positioning grove 22 allows one side of the tablet PC to be inserted into the grove. Press element 12 touches and exerts pressure to the other side on tablet PC to fasten the position. By using different positioning groove 22 and adjusting height of press element 12, tilt angle of tablet PC can be adjusted.

Furthermore, platform unit 2 includes a second placement area 23 and two third placement areas 24. Second placement area 23 is a concave groove area, located close to coupling position of platform unit 2 and support unit 1. Third placement areas 24 are located at two sides of second placement area 23, with higher elevation. In the present embodiment, with second placement area 23 and press element 12, a smart phone can be fastened in a standing position, while with third placement areas 24 and press element 12, a smart phone can be fastened in a horizontal position. As such, different portable device can be fastened between platform unit 2 and support unit 1.

In addition, center part of platform unit 2 further includes a concave accommodation area 25. Shape of accommodation area 25 matches shape of support unit 1 so that support unit 1 can be partially hidden in accommodation area 25 to reduce thickness when folded.

Furthermore, platform unit 2 includes a hanger shoulder 26. In the present embodiment, hanger shoulder 26 is located on the same side as coupling position of platform unit 2 and support unit 1 and has a curvy shape of a clothes hanger so that when folded, hanger shoulder 26 can be used to hang a suit or clothes. The details will be described later.

The known seat and headrest inside a car are often connected and fastened by two columns. As shown in FIG. 2, fasten unit 3 includes a fasten assembly 31 and a position adjusting base 32. One end of position adjusting base 32 is coupled to back of support unit 1 to limit support unit 1 to adjust position only at 0° or 180°. The other end of position adjusting base 32 is adjustably coupled to fasten assembly 31, with coupling position using a rotational button 321 to release or tighten for angle adjustment or fastening. As shown in FIG. 1, when expanded to L shape, fasten assembly 31 and position adjusting base 32 are perpendicularly connected to the back of support unit 1. As shown in FIG. 2, when folded, fasten assembly 31 is adjusted to attach flatly to the back of support unit 1 to reduce volume.

Figure 3:
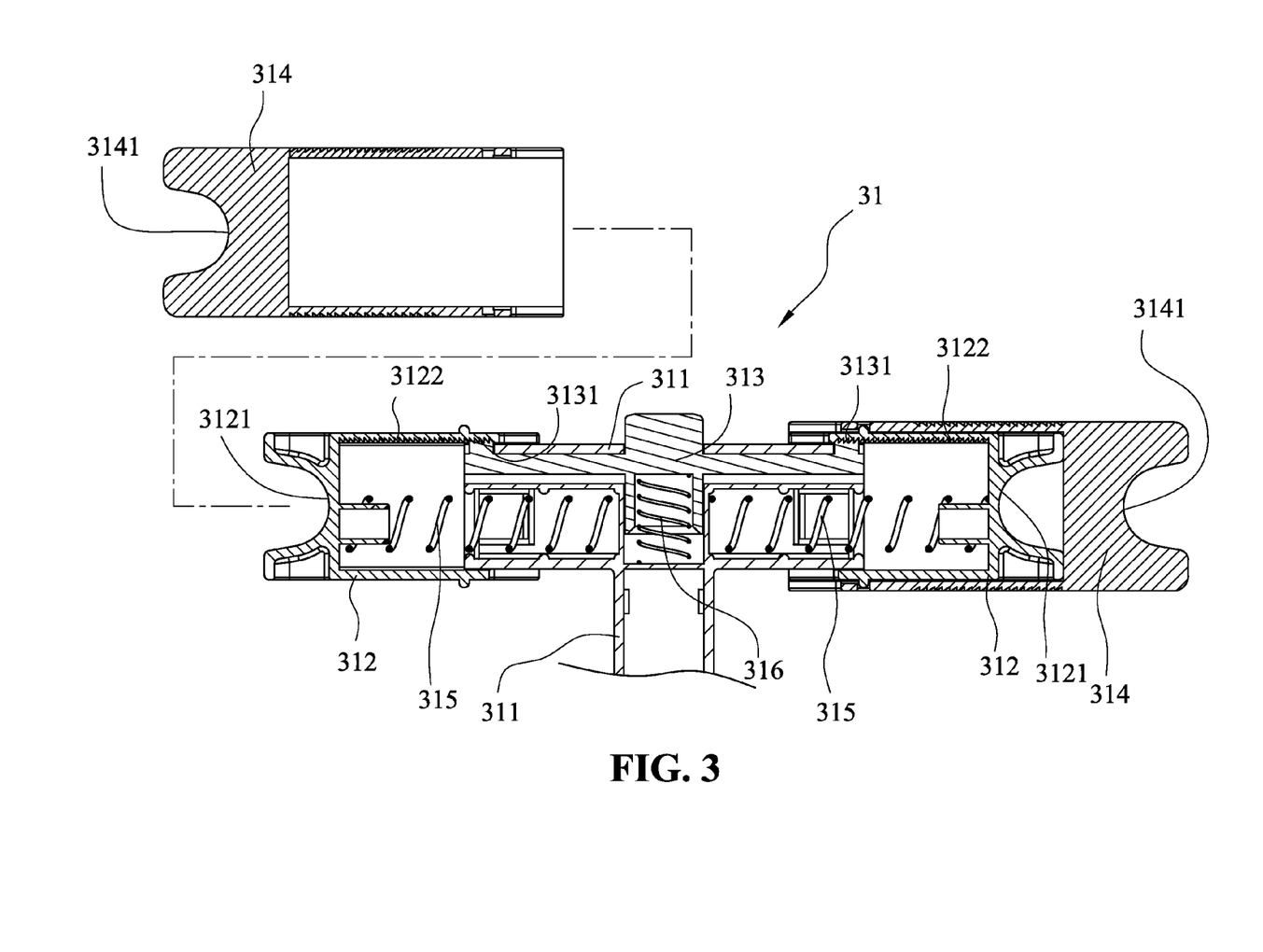
FIG. 3 shows a cross-sectional view of the fasten assembly of the present invention.

As shown in FIG. 3, fasten assembly 31 includes a T-shape connect element 311, two slide elements 312, and a release element 313. Two slide elements 312 are disposed at two lateral ends of T-shape connect element 311 and can slide in linear fashion without disengaged from connect element 311. Each of slide elements 312 has an arc-shape stuck wall 3121, and stuck walls 3121 of two slide elements 312 disposed on T-shape connect element 311 are on the same straight line but in opposite directions. Release element 313 is disposed at connect element 311 and can contact slide elements 312 to fasten position to keep slide elements 312 from sliding. A force can be applied to release element 313 to release the fastening.

Fasten assembly 31 further includes two sheath elements 314. Sheath elements 314 are hollow and have an arc-shape stuck wall 3141 so that the user has an option of sheathing sheath elements 314 to slide elements 312 to extend length of slide elements 312.

The following describes the operation of release element 313 and slide elements 312. Slide elements 312 are disposed on lateral shell of connect element 311 and can slide laterally without disengaged from connect element 311. Two first springs 315 are disposed inside connect element 311. Each first spring 315 touches a corresponding slide element 312 to provide force for slide elements 312 to slide in opposite directions. Inner wall of slide element 312 includes unidirectional ratchet 3122. Release element 313 is also disposed at connect element 311 and can move in linear fashion, with a move direction perpendicular to slide direction of slide elements 312. Each of two arms of release element 313 has stuck teeth 3131, and stuck teeth 3131 can be coupled with ratchet 3122. A second spring 316 is disposed inside connect element 311. Second spring 316 touches inner wall of release element 313. Without applying external force, stuck teeth 3131 is stuck to ratchet 3122 of slide elements 312 because of the force of second spring 316.

Without applying external force, two slide elements 312 disposed on lateral shell of connect element 311 are farthest apart from each other. To install the present invention on two columns between the seat and headrest, a force must be applied to press release element 313 and to push slide elements 312 to make two slide elements 312 slide towards each other. Then, stuck walls 3121 of two slide elements 312 outwardly touch two columns respectively and release element 313 is released so that fasten assembly 31 is fastened to two columns. Because the distance between two columns of the headrest is not identical in different cars, the present invention provides sheath elements 314 on the outside of slide elements 312 to extend length.

Position adjusting base 32 is adjustably attached to the back of support unit 1 in an axial manner. An axial conjunction structure provides a resilient positioning and stuck function to allow support unit for 180° rotation. When applied force exceeds a default value, support unit 1 rotates pivotally around position adjusting base 32. When rotation reaches 180°, an inside resilient positioning and suck element pushes and gets stuck again to indicate this point is another positioning point. In addition, in the present embodiment, axial conjunction position of positioning adjusting base 32 is away from the coupling position of support unit 1 and platform unit 2 so that, after support unit 1 rotates, hanger shoulder 26 is close to headrest elevation for hanging clothes.

Figure 4:
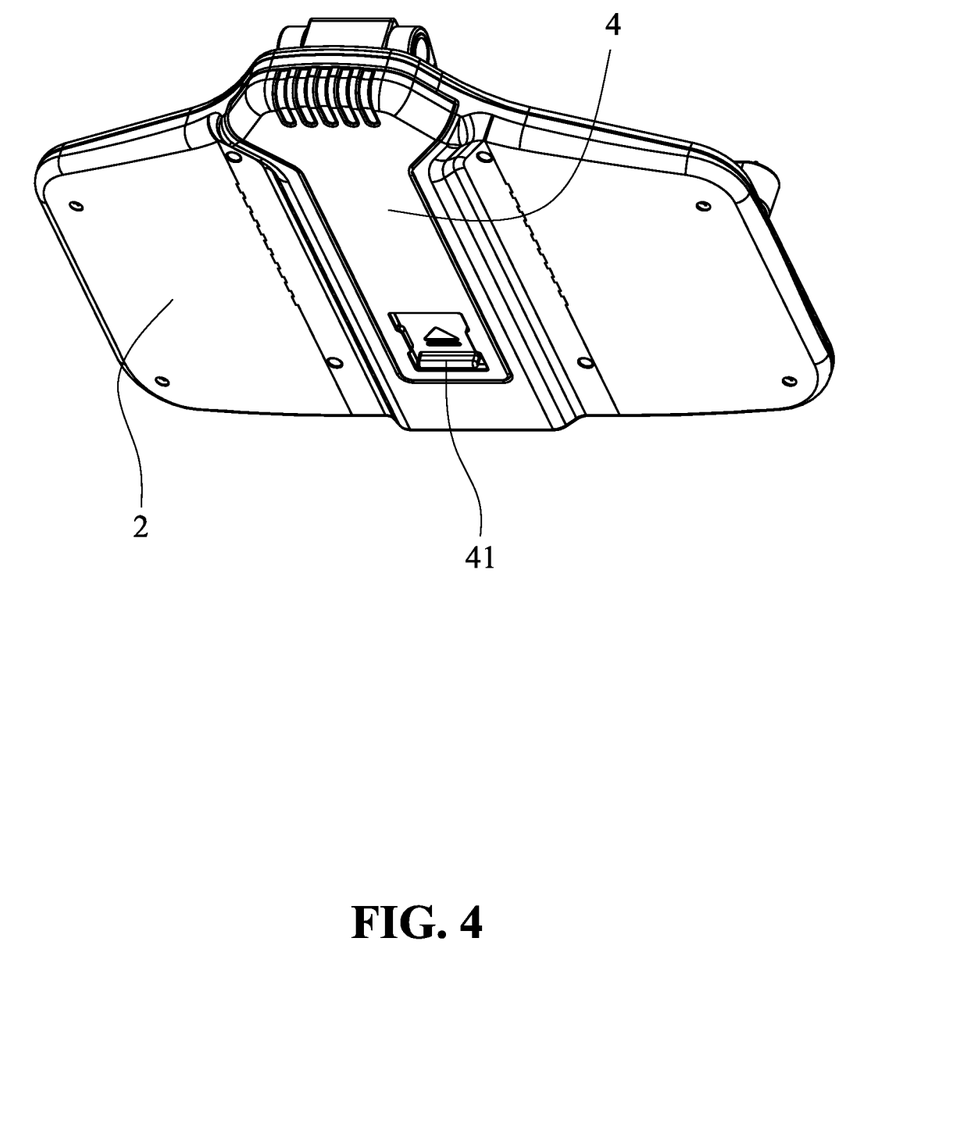
FIG. 4 shows a schematic view from another angle of the present invention when folded.

As shown in FIG. 1 and FIG. 3, push unit 4 is disposed at back of platform unit 2, located close to coupling position of support unit 1 and platform unit 2. After adjustment, push unit 4 can extend beyond platform unit 2 like a hanging arm. A switch element 41 is disposed at push unit 4. Switch element 41 is a switch for position locking or releasing. In FIG. 4, switch element 41 is in locking state. At this point, push unit 4 is fastened and unmovable. After pushing switch element 41 in arrow direction indicated in the figure, switch element 41 is in unlock state. At this point, push unit 4 can extend laterally (as shown in FIG. 1) or retract. To fasten after adjustment, switch element 41 is flipped back to locking state.

Figure 5:
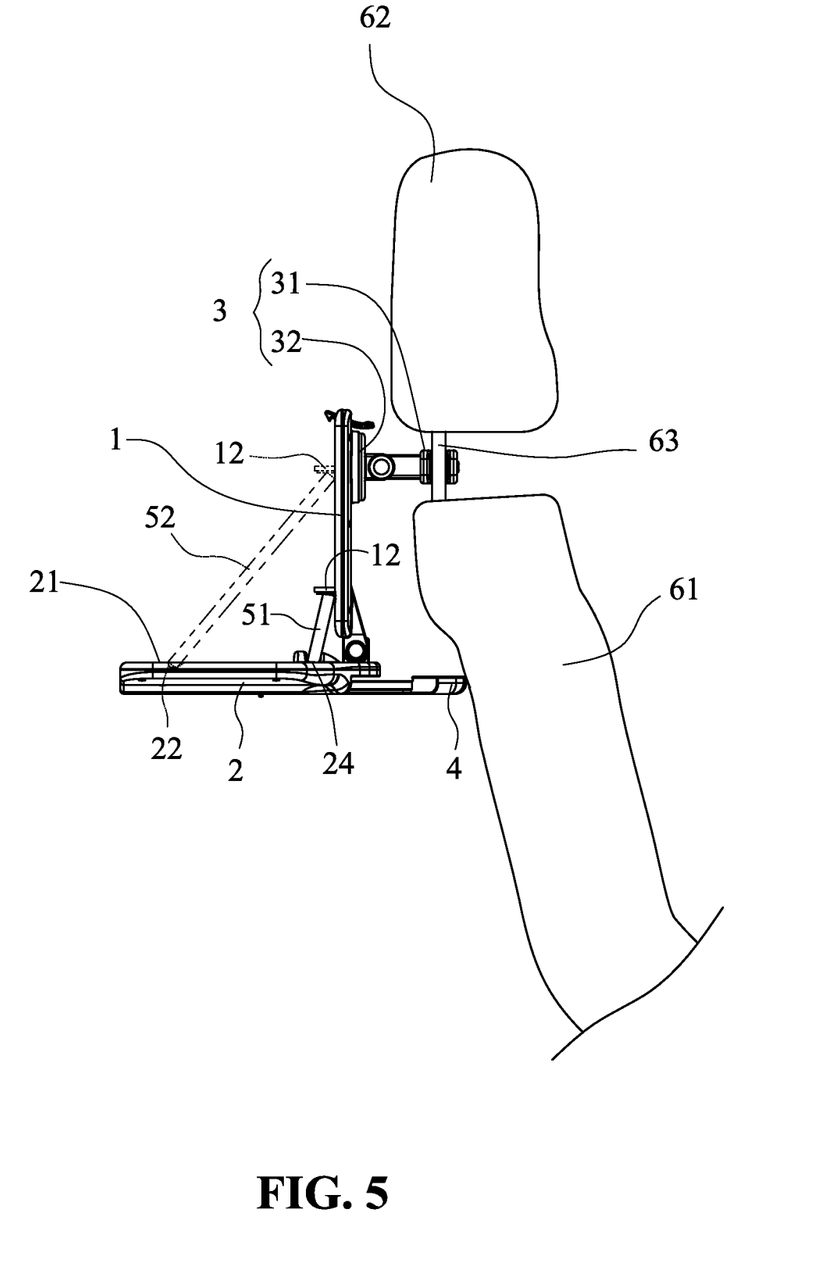
FIG. 5 shows a side view of the present invention fastened to back of the seat when expanded.

FIG. 5 is a schematic view of the present invention in actual application. Auxiliary apparatus of the present invention uses fasten assembly 31 of fasten unit 3 to fasten to two columns 63 between seat 61 and headrest 62 (only one column is visible in the figure). Then, support unit 1 and platform unit 2 are expanded to L-shape. Angle between fasten assembly 31 and position adjusting base 32 is adjusted. Push unit 4 is pushed out to push against back of seat 61. As such, platform unit 2 is horizontally disposed to provide a temporary desk top for the backseat passenger to place objects. Because seat 61 may tilt at different angle in different car, the present invention uses adjustable extension length of push unit 4 or adjustable angle between fasten assembly 31 and position adjusting base 32 to overcome the above problem. Platform unit 2 of the present invention uses first placement area 21 to provide a flat surface for placing notebook PC or other objects. With third placement area 24 and press element 12, a smart phone 51 can be fastened in a horizontal position. If press element 12 moves upward, press element 12 and positioning groove 22 can be used together to fasten tablet PC 52 in a tilt position, suitable for viewing movies. Therefore, the auxiliary apparatus of the present invention can allow the backseat passenger to use a variety of portable electronic devices.

Figure 6:
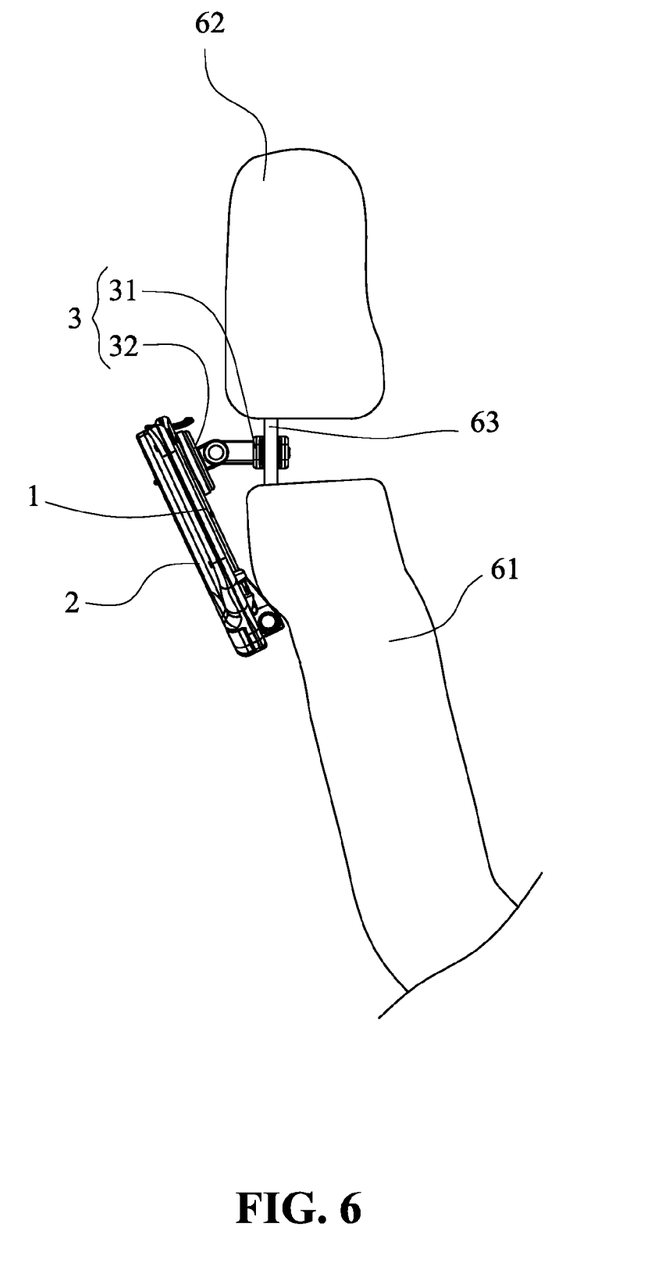
FIG. 6 shows a side view of the present invention when folded to back of the seat.

When not in use, the auxiliary apparatus can be either detached or stay, as shown in FIG. 6. By folding platform unit 2 and support unit 1, and then adjusting angle between position adjusting base 32 and fasten assembly 31, platform unit 2 and support unit 1 can attach to back of seat 61 without taking up much space.

Figure 7A:
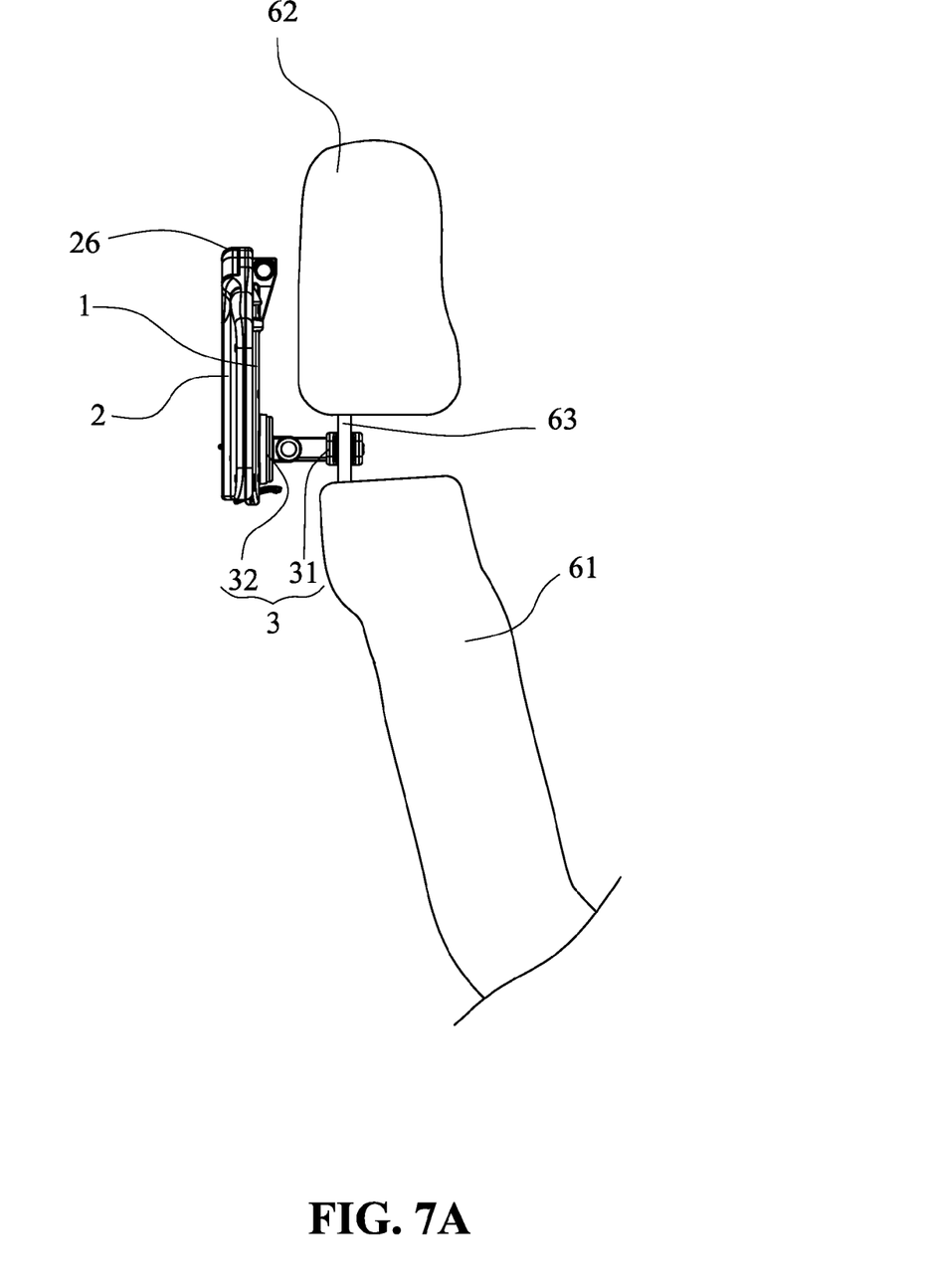
FIG. 7A shows a side view of the present invention used as a clothes hanger.
Figure 7B:
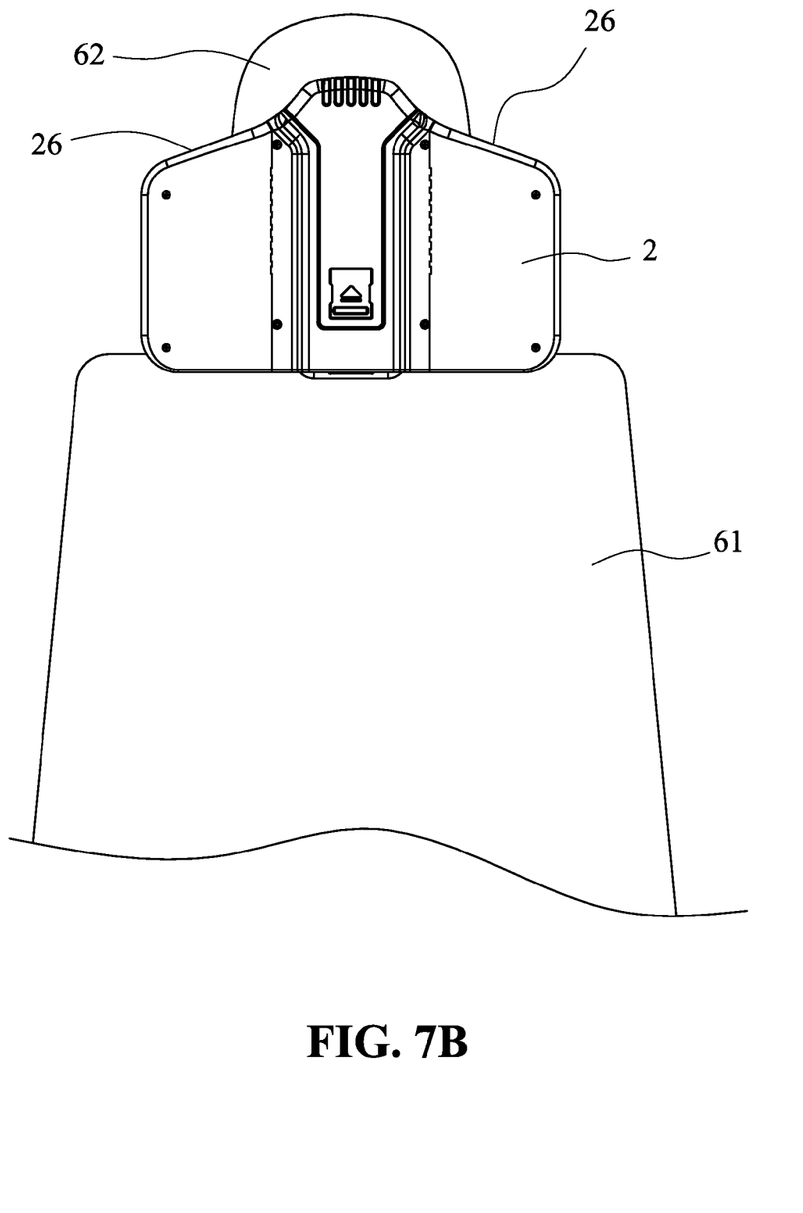
FIG. 7B shows a front view of the present invention used as a clothes hanger.

The auxiliary apparatus of the present invention provides another function, i.e., as a clothes hanger. As shown in FIG. 7A and FIG. 7B, platform unit 2 and support unit 1 are folded. At this point, support unit 1 rotates 180° pivotally around position adjusting base 32 so that hanger shoulder 26 of platform unit 2 is turning upward so that a suit or other clothes can be hanged on the circumference of platform unit 2 like a hanger. After support unit 1 rotates, elevation of hanger shoulder 26 is raised to near headrest 62 to provide sufficient length for hanging clothes.

Figure 8:
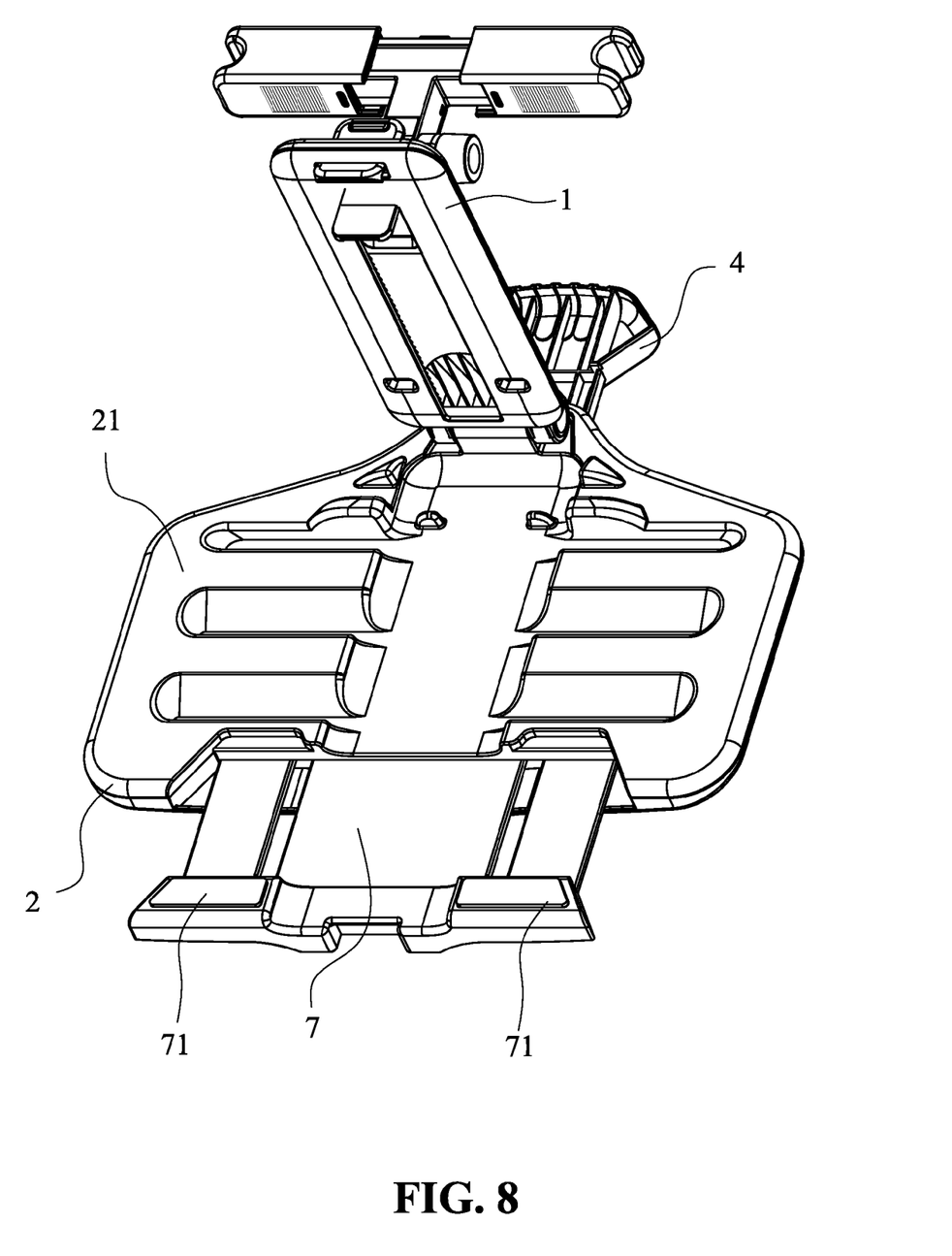
FIG. 8 shows a schematic view of the present invention in another application.

As shown in FIG. 8, platform unit 2 is disposed with an extension element 7. Extension element 7 is disposed inside platform unit 2 and can move laterally to beyond platform unit 2 hanging like an arm. Direction of extension is away from coupling position of platform unit 2 and support unit 1. Extension element 7 includes at least an auxiliary placement area 71, with elevation close to or equal to elevation of first placement area 21 to serve as an extension area for placement for better stability.

In summary, the auxiliary apparatus of the present invention can be expanded to L-shape to be fastened to columns between seat and headrest to provide placement of portable objects and convenient viewing of movies for backseat passenger. The present invention allows user to operate portable electronic devices placed on auxiliary apparatus. When folded, the size of the auxiliary apparatus is small enough for easy accommodation. In addition, the present invention cal also be used as a clothes hanger to provide additional value.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for hanging on a seatback inside a vehicle, by being installed to columns between a seat and a headrest inside the vehicle, comprising:
    a support unit;
    a platform unit, said support unit and said platform unit being coupled on one side and being expandable to form an L shape, said platform unit having a first placement area and at least a positioning groove on a surface facing said support unit, said support unit being disposed with an adjustable press element on a side wall facing said platform unit, said platform unit having a hanger shoulder;
    a fasten unit coupled to a back of said support unit and being fastenable to the columns, and including a fasten assembly for fastening to the columns, and a position adjusting base, one end of said position adjusting base being coupled to said fasten assembly at an adjustable coupling angle, another end of said position adjusting base being attached to a back of said support unit in an axial conjunction manner, said fasten assembly comprising
    a T-shape connect element, two slide elements disposed at two lateral ends of said T-shape connect element and each being slidable in a linear fashion without disengaging from said T-shape connect element, each of said slide elements having an arc-shape stuck wall disposed on said T-shape connect element, said arc-shape stuck walls being on a same straight line but in opposite directions, said fasten assembly further comprising a release element disposed at said T-shape connect element and being contactable with said slide elements in a fasten position to keep said slide elements from sliding, wherein when a force is applied to said release element, said release element is released from fastening; and
    a push element adjustably disposed to said platform unit and being adjustable to extend beyond said platform unit like a hanging arm.

2. The apparatus as claimed in claim 1, wherein said hanger shoulder has a curvy shape, at a coupling position of said platform unit and said support unit, and gradually increases downwards.

3. The apparatus as claimed in claim 1, wherein said support unit further comprises a second placement area located close to a coupling position of said platform unit and said support unit.

4. The apparatus as claimed in claim 3, wherein said support unit further comprises at least a third placement area located on two sides of said second placement area, an elevation of said third placement area being different from an elevation of said second placement area.

5. The apparatus as claimed in claim 1, wherein said push element is disposed on said platform at location close to a coupling position of said platform unit and said support unit.

6. The apparatus as claimed in claim 1, wherein an axial conjunction position of said position adjusting base is located away from a coupling position of said platform unit and said support unit.

7. The apparatus as claimed in claim 1, wherein said fasten assembly further comprises two sheath elements, said sheath elements being hollow and each having an arc-shape stuck wall and being able to sheath over said slide elements.

8. The apparatus as claimed in claim 1, wherein said platform unit further includes an extension element that comprises at least an auxiliary placement area having an elevation close to or equal to an elevation of said first placement area, extension element being disposed inside said platform unit and being movable laterally to beyond said platform unit to hang like an arm, a direction of extension being away from a coupling position of said platform unit and said support unit.

9. An apparatus for hanging on a seatback inside a vehicle, by being installed to columns between a seat and a headrest inside the vehicle, comprising:
    a support unit;
    a platform unit, said support unit and said platform unit being coupled on one side and being expandable to form an L-shape, said platform unit having a first placement area and at least a positioning groove on a surface facing said support unit, said support unit being disposed with an adjustable press element on a side wall facing said platform unit, said press element being coupled to a positioning slide block, said platform unit having a hanger shoulder;
    a fasten unit coupled to a back of said support unit and being fastenable to the columns; and a push element adjustably disposed to said platform unit and being adjustable to extend beyond said platform unit like a hanging arm, wherein when not in use, said press element is flipped down to be close to said positioning slide block; and when an external force is applied to said positioning slide block, said positioning slide block moves linearly along said support unit.

\* \* \* \* \*